United States Patent
Strohmaier et al.

(10) Patent No.: US 6,294,493 B1
(45) Date of Patent: Sep. 25, 2001

(54) SILICOALUMINOPHOSPHATES HAVING AN AEL STRUCTURE

(75) Inventors: Karl G. Strohmaier, Port Murray; David E. W. Vaughan, Flemington, both of NJ (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/315,416

(22) Filed: May 20, 1999

Related U.S. Application Data
(60) Provisional application No. 60/086,681, filed on May 26, 1998.

(51) Int. Cl.⁷ .................................................. B01J 29/06
(52) U.S. Cl. .................... 502/64; 502/63; 502/79; 502/208; 502/214; 502/232; 502/263; 423/306; 423/328.1; 423/330.1
(58) Field of Search .................... 502/60, 64, 63, 502/78, 79, 208, 214, 232, 263; 423/306, 328.1, 330.1

(56) References Cited

U.S. PATENT DOCUMENTS

| | | | |
|---|---|---|---|
| 4,440,871 | 4/1984 | Lok | 502/214 |
| 4,499,315 | 2/1985 | Garska et al. | 585/415 |
| 4,512,875 | 4/1985 | Long et al. | 208/114 |
| 4,683,050 | 7/1987 | Ward | 208/110 |
| 4,724,066 | 2/1988 | Kirker | 208/114 |
| 4,734,185 | 3/1988 | Pellet et al. | 208/114 |
| 4,791,083 | 12/1988 | Pellet | 502/64 |
| 4,803,184 | 2/1989 | Long et al. | 502/63 |
| 4,818,739 | 4/1989 | Gortsema et al. | 502/67 |
| 4,826,804 | 5/1989 | Shamshoum | 502/214 |
| 4,857,495 | 8/1989 | Gortsema et al. | 502/214 |
| 4,859,311 | 8/1989 | Miller | 208/89 |
| 4,859,312 | 8/1989 | Miller | 208/111 |
| 4,859,314 | 8/1989 | Pellet et al. | 208/114 |
| 4,880,760 | 11/1989 | Pellet et al. | 502/67 |
| 4,906,351 | 3/1990 | Pellet et al. | 208/111 |
| 4,913,798 | 4/1990 | Gortsema et al. | 208/111 |
| 4,914,067 | 4/1990 | Pellet et al. | 502/63 |
| 4,921,594 | 5/1990 | Miller | 208/58 |
| 4,943,424 | 7/1990 | Miller | 423/328 |
| 4,960,504 | 10/1990 | Pellet et al. | 208/411 |
| 4,976,846 | 12/1990 | Long et al. | 208/114 |
| 4,992,160 | 2/1991 | Long et al. | 208/111 |
| 5,087,347 | 2/1992 | Miller | 208/46 |
| 5,096,684 | 3/1992 | Guth et al. | 423/306 |
| 5,139,647 | 8/1992 | Miller | 208/100 |
| 5,149,421 | 9/1992 | Miller | 208/114 |
| 5,185,310 | 2/1993 | Degnan et al. | 502/214 |
| 5,208,005 | 5/1993 | Miller | 423/792 |
| 5,300,277 | 4/1994 | Kresge et al. | 423/703 |
| 5,360,474 | * 11/1994 | Lauth et al. | 106/402 |
| 5,413,695 | 5/1995 | Miller | 208/28 |
| 5,472,594 | 12/1995 | Tsang et al. | 208/114 |
| 5,486,284 | 1/1996 | Degnan et al. | 208/120 |
| 5,723,716 | 3/1998 | Brandes et al. | 585/734 |
| 5,730,858 | 3/1998 | Olivier et al. | 208/28 |
| 5,770,042 | 6/1998 | Galperin et al. | 208/65 |
| 5,804,058 | 9/1998 | Grandvallet et al. | 208/171 |
| 5,831,139 | 11/1998 | Schmidt et al. | 585/315 |
| 5,833,837 | 11/1998 | Miller | 208/80 |
| 5,879,655 | * 3/1999 | Miller et al. | 423/702 |
| 5,888,378 | 3/1999 | Kowalski | 208/114 |
| 5,989,518 | * 11/1999 | Tannous et al. | 423/717 |

FOREIGN PATENT DOCUMENTS 146384   6/1985   (EP) .

OTHER PUBLICATIONS

K.J. Chao, et al., *Silicon species in a SAPO–5 molelcular sieve*, Applied Catalysis, 72, (1991) 34–39.

M.J. Franco, et al., *Study of SAPO–5 obtained from surfactant–containing gels: Part 1. Crystallization parameters and mechanism of Si substitution*, Zeolites 15:117–123 (1995).

J. Agundez, et al., *Synthesis of SAPOs from Microemulsions: A General Method to Obtain Materials with Enhanced Catalytic Activity* (Abstract), 11th International Zeolite Conference, RP25, 1996.

J. Agundez, et al., *Synthesis of SAPOs from Microemulsions: A General Method to Obtain Materials with Enhanced Catalytic Activity*, Discussions on Zeolite and Microporous Materials, 1997, Hanrimwon Publishing Co., Seoul, Korea.

P. Meriaudeau, et al., *Isomorphous substitution of silicon in the AlPO4 framework with AEL structure: n–octane hydroconversion*, Microporous and Mesoporous Materials 22 (1998) 435–449.

* cited by examiner

Primary Examiner—Steven P. Griffin
Assistant Examiner—Christina I'debrando

(57) ABSTRACT

Disclosed are silicoaluminophosphates (SAPOs) having unique silicon distributions and high catalytic cracking activity, a method for their preparation and their use as FCC catalysts. More particularly, the new SAPOs have a high silica:alumina ratio and favorable Si atom distribution. The new SAPOs may have a small crystal size and may be synthesized from a single- phase synthesis solution.

25 Claims, 7 Drawing Sheets

Figure 1

| P | Al | P | Al | P | Al | P | Al | P | Al |
|---|---|---|---|---|---|---|---|---|---|
| Al | P | Al | Si | Al | P | Al | P | Al | P |
| P | Al | P | Al | P | Al | Si | Al | P | Al |
| Al | P | Al | P | Al | Si | Si | Si | Al | P |
| P | Al | P | Al | P | Al | Si | Al | P | Al |
| Al | P | Al | Si | Al | P | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Al | P | Al | P | Al | P |
| P | Al | P | Al | P | Al | P | Al | P | Al |
| Al | P | Al | P | Al | P | Al | P | Al | P |

Figure 6(a) – SEM of product form Example 4.

Figure 6(b) – SEM of conventional SAPO-11 material

US 6,294,493 B1

SILICOALUMINOPHOSPHATES HAVING AN AEL STRUCTURE

A. 35 U.S.C. 119(e) This application claims the benefit of U.S. Provisional Application Ser. No. 60/086,681, May 26, 1998.

FIELD OF THE INVENTION

This invention relates to high-activity silicoaluminophosphates (SAPOs) having unique silicon distributions, a method for their preparation and their use as Fluid Catalytic Cracking ("FCC") catalysts. More particularly, the new SAPOs, designated herein as ECR-42, have a high silica:alumina ratio and a beneficial silicon atom distribution.

BACKGROUND OF THE INVENTION

The need for low emissions fuels has created an increased demand for light olefins for use in alkylation, oligomerization, MTBE and ETBE synthesis processes. In addition, a low cost supply of light olefins, particularly propylene, continues to be in demand to serve as feedstock for polyolefin, particularly polypropylene production.

Fluidized and fixed bed processes have recently attracted renewed interest for increasing olefin production. For example, U.S. Pat. No. 4,830,728 discloses an FCC unit that is operated to maximize olefin production. The FCC unit has two separate risers into which a different feed stream is introduced. The operation of the risers is designed so that a suitable catalyst will act to convert a heavy gas oil in one riser and another suitable catalyst will act to crack a lighter olefin/naphtha feed in the other riser. Conditions within the heavy gas oil riser can be modified to maximize either gasoline or olefin production. The primary means of maximizing production of the desired product is by using a specified catalyst.

Often, conventional hydrocarbon conversion processes utilize crystalline zeolites as catalysts. Crystalline zeolites have been found to be effective for a wide variety of hydrocarbon conversion processes including the catalytic cracking of a gas oil to produce naphthas and olefins. Conventionally, crystalline zeolite is incorporated into a matrix in order to form a catalytic cracking catalyst.

It is also known that improved cracking results will be obtained with regard to the catalytic cracking of gas oils if a crystalline zeolite having a pore size of less than 7 Å is included with a crystalline zeolite having a pore size greater than 8 Å, either with or without a matrix, as set forth in U.S. Pat. No. 3,769,202. In this regard, a large pore size crystalline zeolite (pore size greater than 7 Å) may be used in admixture with ZSM-5 type zeolite. The use of ZSM-5 in conjunction with a zeolite cracking catalyst of the X or Y faujasite variety is described in U.S. Pat. Nos. 3,894,931; 3,894,933; and 3,894,934.

There remains a need, though, for improved catalysts that may be added to conventional (i.e., large pore) FCC catalyst, especially additive catalysts that result in improved activity and selectivity for light olefin formation, especially propylene formation.

Conventional silicoaluminophoshates such as SAPO-11 are catalytically active molecular sieves, especially at high silicon concentrations. However, such materials are prone to detrimental silicon distribution in the framework at high silicon concentration, above about 0.04 molar Si fraction in the framework, resulting in a diminished catalytic activity. Moreover, even materials with a favorable Si distribution in the framework may undergo an undesirable redistribution of framework Si during, for example, catalyst regeneration. There is therefore a need for improved silicoaluminophosphates that have increased catalytic activity at high silicon concentration, and improved activity maintenance characteristics.

SUMMARY OF THE INVENTION

In one embodiment, the invention is a composition comprising a major amount of a large-pore zeolite catalyst and a minor amount of a molecular sieve composition with a framework tetrahedra of silicon, aluminum, and phosphorus, the molecular sieve having a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the silicon present in the molecular sieve and the conventional SAPO-11 is distributed among silicon sites in the framework tetrahedra, each site having a first, a second, a third, and a fourth nearest neighbor position, and each nearest neighbor position being independently occupied by one atom selected from silicon, and aluminum, and (b) the molecular sieve has a substantially smaller number of silicon sites having silicon atoms among all four nearest neighbor positions than the conventional SAPO-11 with the total silicon amount.

In another embodiment, the invention is a fluidized catalytic cracking method comprising injecting a feed into an FCC riser reactor having a reaction zone and catalytically cracking the feed in the reaction zone under catalytic cracking conditions in the presence of a catalytically effective amount of a cracking catalyst in order to form a cracked product, the cracking catalyst containing a molecular sieve catalyst composition with a framework tetrahedra of silicon, aluminum, and phosphorus, the molecular sieve having a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the silicon present in the molecular sieve and the conventional SAPO-11 is distributed among silicon sites in the framework tetrahedra, each site having a first, a second, a third, and a fourth nearest neighbor position, and each nearest neighbor position being independently occupied by one atom selected from silicon, and aluminum, and (b) the molecular sieve has a substantially smaller number of silicon sites having silicon atoms among all four nearest neighbor positions than the conventional SAPO-11 having the same total silicon amount.

In another embodiment, the invention is a fluidized catalytic cracking method comprising injecting a feed into an FCC riser reactor having a reaction zone and catalytically cracking the feed in the reaction zone under catalytic cracking conditions in the presence of a cracking catalyst in order to form a cracked product, the cracking catalyst containing a major amount of a large-pore zeolite catalyst and a minor amount of a molecular sieve catalyst with a framework tetrahedra of silicon, aluminum, and phosphorus, the molecular sieve having a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the silicon present in the molecular sieve and the conventional SAPO-11 is distributed among silicon sites in the framework tetrahedra, each site having a first, a second, a third, and a fourth nearest neighbor position, and each nearest neighbor position being independently occupied by one atom selected from silicon, and aluminum, and (b) the SAPO molecular sieve has a substantially smaller number of silicon sites having silicon atoms among all four nearest neighbor positions than the conventional SAPO-11 having the same total silicon amount.

In another embodiment, the invention is a composition comprising a major amount of a large-pore zeolite catalyst and a minor amount of a molecular sieve, the molecular sieve having a framework tetrahedra of silicon, aluminum, and phosphorus, a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the molecular sieve has a first number of Si atoms coordinated as Si(4Si), (b) the conventional SAPO-11 with the Si amount has a second number of Si atoms coordinated as Si(4Si), and (c) the first number of Si atoms is substantially less than the second number of Si atoms.

In another embodiment, the invention is a fluidized catalytic cracking method comprising injecting a feed into an FCC riser reactor having a reaction zone and catalytically cracking the feed in the reaction zone under catalytic cracking conditions in the presence of a cracking catalyst in order to form a cracked product, the cracking catalyst containing a molecular sieve having a framework tetrahedra of silicon, aluminum, and phosphorus, a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the molecular sieve has a first number of Si atoms coordinated as Si(4Si), (b) the conventional SAPO-11 with the Si amount has a second number of Si atoms coordinated as Si(4Si), and (c) the first number of Si atoms is substantially less than the second number of Si atoms.

BRIEF DESCRIPTION OF THE DRAWINGS

FIG. 1 schematically shows the type of silicon environments in SAPO-type molecular sieves.

DETAILED DESCRIPTION OF THE INVENTION

Figure 2:
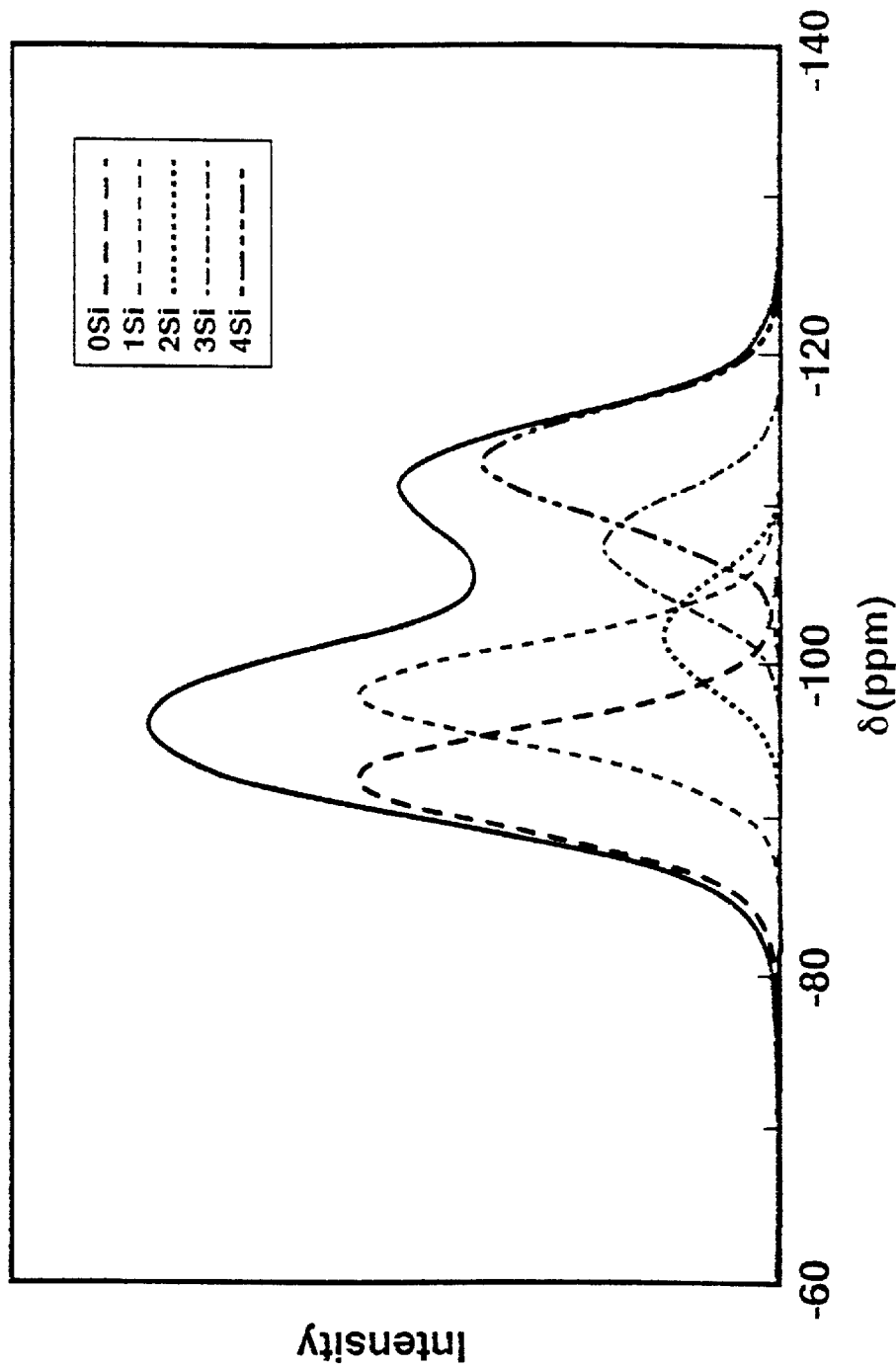
FIG. 2 shows a representative deconvolution of an $^{29}$Si NMR spectrum.

The invention is based in part on the discovery that (1) SAPO materials having the AEL structure and designated ECR-42 herein may be prepared as small crystals with high silicon concentration and without undesirable silicon island formation, (2) such materials have high activity and selectivity for cracking hydrocarbons such as gas oils, naphtha-boiling range hydrocarbons ("naphtha"), and high olefins into light olefins such as propylene, (3) such materials may be prepared with desirable crystallite size and shape, and (4) SAPO precursor gels such as a silicoaluminophosphate gel may be formed from an aqueous synthesis solution containing no added alcohol or surfactant.

In other words, it has been discovered that modifying the synthesis of a silicon-substituted aluminophosphate by changing the composition of the synthesis mixture, the synthesis conditions, or both, modifies the silicon distribution in the silicoaluminophosphate thus formed. This changed distribution of silicon has a major beneficial influence on the catalytic activity of the silicoaluminophosphate.

The following sections set forth the synthesis and use of the preferred ECR-42 molecular sieves. Section A describes the preferred molecular sieve synthesis processes, Section B describes the preferred molecular sieve catalysts, Section C describes the physical differences between the preferred ECR-42 and conventional SAPO-11, and Section D describes the use of the preferred ECR-42 molecular sieve catalysts in catalytic cracking processes.

A. Synthesis of Preferred AEL-Type SAPO Molecular Sieves

When AEL-type molecular sieve materials are synthesized following the procedure described herein, the distribution of Si and therefore the total number and strength of acid sites in the molecular sieve framework is quite different, and much higher than those of previously reported forms of SAPO molecular sieves.

The preferred silicoaluminophosphate composition, ECR-42, has the topology AEL which corresponds to SAPO-11. The AEL topology is defined in the *"Atlas of Zeolite Structure Types,"* 4th Ed, by W. M. Meier, D. H. Olson and Ch. Baerlocher, Elsevier, 1996. Although the composition is isostructural with other AEL molecular sieve materials, it is a distinct molecular sieve composition because the silicon, aluminum, and phosphorus atoms present in a preferred composition of this invention are not arranged the same way as in conventional SAPO-11 molecular sieve. Those skilled in the art will recognize that two isostructural molecular sieves may be entirely different compositions having entirely different properties, depending on, for example, the nature and distribution of the constituent atoms.

Preferred molecular sieve compositions are physically different from other SAPO's having the AEL structure because the silicon atoms are distributed differently in the molecular sieve framework. The physical structure of the preferred composition (and its silicon distribution) is illustrated schematically in FIG. 1. While the actual structure is three dimensional and contains oxygen in addition to silicon, aluminum and phosphorus, the figure's atomic positions are represented on a two dimensional array and oxygen atoms are omitted for clarity. As is shown in the figure, each lattice site in the framework has four nearest neighbor lattice sites. In the preferred compositions, as with all AEL-type SAPOs, a lattice site occupied by a silicon 4+ cation, i.e., a "silicon site", ordinarily may not have a phosphorus 5+ cation as a nearest neighbor. The four nearest neighbor lattice sites may therefore be occupied by one silicon and three aluminum cations, two silicon and two aluminum cations, three silicon and one aluminum cations, four silicon cations, or four aluminum cations. As discussed, conventional AEL-type SAPOs with increased silicon concentration, above about 4 molar %, contain undesirable silicon islands, i.e., silicon atoms in the framework having four silicon atom nearest neighbors. The silicon atoms in the preferred composition are physically distributed so that the silicon island concentration is greatly reduced compared with conventional SAPO-11 (i.e., SAPO-11 prepared in accordance with the methods disclosed in the prior art) having the same total silicon concentration.

The preferred molecular sieve compositions have both a desirably high silicon concentration and a desirable silicon atom dispersion (i.e. a smaller number of silicon islands than would be present in conventional SAPO-11 with the same silicon content) may be formed in accordance with conventional molecular sieve synthesis techniques. The preferred ECR-42 synthesis processes commence with the formation of a silicoaluminophosphate gel having the formula

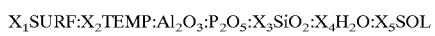

wherein SURF is a surfactant capable of forming a microemulsion between synthesis solution's organic and aqueous phases. While not wishing to be bound by any theory or model, it is believed that the surfactant helps to solubilize the organic tetraalkylorthosilicate silica source and also increases the available interface between the organic species and inorganic species in the synthesis gel resulting in an improvement in the final silica distribution in the silicoaluminophosphate product. Non-limiting examples of useful surfactants include one or more of long chain alkylamines such as hexadecylamine, tetradecylamine, dodecylamine, decylamine, or octylamine, or dimethyl alkylamine compounds such as dimethylhexadecylammine or dimethyloctylamine, or trimethylalkylammonium salts such as trimethylhexadecylammounium chloride.

TEMP is a template capable of structure directing to AEL such as di-n-propylamine, diisopropylamine, or diethylamine for forming the preferred ECR-42 silicoaluminophosphate molecular sieve.

SOL is a water-soluble organic co-solvent capable of solubilizing the organic silicon source. While not wishing to be bound, it is believed that solubilizing organic silicon sources such as a tetraalkylorthosilicate silicon source into the aqueous synthesis gel improves the final silicon distribution in the silicoaluminophosphate product. Non-limiting examples of useful water-soluble organic solvents include one or more of acetone, 1,2-propanediol, 1,3-propanediol, methanol, ethanol, propanol, isopropanol, butanol, or ethylene glycol.

The silicon source material may be any organic silicon species capable of being dispersed or dissolved in an aqueous synthesis solution. As discussed, where an organic silicon species is employed, a water-soluble organic solvent, SOL, is preferably employed. While not wishing to be bound by any theory or model, it is believed dispersing the silicon species in a low molecular weight form in the silicoaluminophosphate synthesis gel improves silicon distribution of the preferred ECR-42 material formed therefrom. Non-limiting examples of useful silicon source materials include one or more of tetraalkylorthosilicates such as tetramethylorthosilicate, tetraethylorthosilicate, tetrapropylorthosilicate, tetrabutylorthosilicate, and silsesquisiloxanes having up to twelve Si centers.

$X_1$ ranges from about 0 to about 0.5, $X_2$ ranges from about 0.1 to about 4, $X_3$ ranges from about 0.01 to about 2, $X_4$ ranges from about 10 to about 100, and $X_5$ ranges from about 0 to about 30. The silicoaluminophosphate gel may be formed in accordance with the following processes.

(I) Processes using surfactant and water-soluble co-solvent.
Silicoaluminophosphate gels having the formula

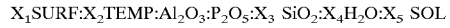

may be prepared by combining a phosphorus source such as $H_3PO_4$, ammonium phosphate, and mixtures thereof; water; and an aluminum source such as hydrated alumina, organo alumina, pseudo-boehmite, aluminum hydroxide, colloidal alumina, and mixtures thereof, and then adding the template in order to form a homogeneous alumino phosphate mixture. The $P_2O_5:Al_2O_3$ molar ratio in the alumino phosphate mixture preferably ranges from about 0.7 to about 1.3, and more preferably ranges from about 0.9 to about 1.1. The TEMP:$Al_2O_3$ molar ratio in the alumino phosphate mixture preferably ranges from about 0.1 to about 5, and more preferably from about 0.5 to about 3. A surfactant solution of the surfactant, the water-soluble organic solvent, and water may then be added to the alumino phosphate mixture along with the organic silicon source and water (if necessary to obtain the desired value of $X_4$) in order to form a synthesis solution having a SURF:$Al_2O_3$ molar ratio preferably ranging from about 0 to about 0.5, and more preferably ranging from about 0.05 to about 0.3. The relative amounts of the ingredients for the synthesis solution may be calculated from the desired values of $X_1$ through $X_5$. The SOL:$Al_2O_3$ molar ratio in the synthesis solution preferably ranging from about 0 to about 30, and more preferably ranging from about 4 to about 20, and the $SiO_2$:$Al_2O_3$ molar ratio preferably ranging from about 0.01 to about 2.0, and more preferably ranging from about 0.1 to about 0.8. The synthesis solution may then be subjected to gel formation conditions in order to provide the silicoaluminophosphate gel. The ingredients of the synthesis solution, surfactant solution, and alumino phosphate mixture may be mixed in any order. For example, in an alternative embodiment the organic silicon source may be added to a mixture of phosphoric acid and the water-soluble organic solvent. The template and the surfactant may then be added, with the water and aluminum source being added last.

Preferred silicoaluminophosphate crystallization conditions for forming the ECR-42 molecular sieve from the gel include heating the gel in a microwave autoclave for a time sufficient to crystallize the gel. Lower temperature and shorter crystallization times are preferred because such conditions may prevent the formation of undesirable products. Accordingly, the preferred heating times range from about 1 minute to about 5 days, at a temperature ranging from about 100° C. to about 250° C., and at a pressure ranging from about 0 bar to about 70 bar. In cases where other products, unreacted gel, or a mixture thereof is present at the conclusion of the reaction, the molecular sieve may be recovered by a separation process such as centrifugation. The process may also include conventional product washing and drying such as an ethanol rinse, followed by a water rinse, followed by air oven drying at a temperature ranging from about ambient temperature to about 200° C. It should be noted that conventional heating, in for example an air oven or an externally heated autoclave, may be substituted for microwave heating in this process, and that a substantially pure ECR-42 molecular sieve composition having the AEL-topology will result with either heating method. When conventional heating is used, the temperature preferably ranges from about 100° C. to about 250° C., and more preferably from 150° C. to about 200° C.

(II) Processes using surfactant, hexanol co-solvent and microwave heating.

Silicoaluminophosphate gels having the formula

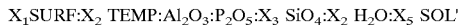

$X_1SURF:X_2\ TEMP:Al_2O_3:P_2O_5:X_3\ SiO_4:X_2\ H_2O:X_5\ SOL'$ wherein SOL' is a relatively water insoluble organic solvent including solvent mixtures capable forming a microemulsion with water and a surfactant, and including mixtures thereof, may be prepared by according to the method (I) above, except that the water insoluble organic solvent SOL' is substituted for the water-soluble solvent SOL. But for the solvent substitution, the molar ratios of the ingredients in the alumino phosphate mixture and the synthesis solution are as set forth in method (I), and as in that method, the mixing order is not critical.

The preferred ECR-42 molecular sieve composition may be formed from the gel in accordance with the steps set forth in process (I). It should be noted that conventional heating may result in the presence of SAPO-41 material in the molecular sieve composition.

(III) Processes using ethanol with water-soluble co-solvent and no added surfactant.

Silicoaluminophosphate gels of stoichiometry:

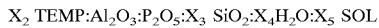

$X_2\ TEMP:Al_2O_3:P_2O_5:X_3\ SiO_2:X_4H_2O:X_5\ SOL$ may be prepared by a method identical to method (I), above, except that no surfactant solution is used. An aqueous solution of water, the water-soluble organic solvent, and the silicon source is used instead of the surfactant solution. But for the absence of the surfactant, the molar ratios of the ingredients in the alumino phosphate mixture and the synthesis solution are as set forth in method (I), and as in that method, the mixing order of the ingredients is not critical.

The preferred ECR-42 molecular sieve composition may be formed from the gel in accordance with the steps set forth in process (I).

(IV) Processes using an organic silicon source and no added surfactant or water-soluble organic cosolvent.

Silicoaluminophosphate gels of stoichiometry:

$X_2\ TEMP:Al_2O_3:P_2O_5:X_3SiO_2:X_4H_2O$ may be prepared by a method identical to method (I), above, except that no surfactant and no co-solvent are employed. An aqueous dispersion of water and an organic, water-dispersible silicon source, such as TEOS, and including mixtures thereof, is used instead of the surfactant solution.

But for the absence of the surfactant, the molar ratios of the ingredients in the alumino phosphate mixture and the synthesis solution are as set forth in method (I), and as in that method, the mixing order of the ingredients is not critical.

The preferred ECR-42 molecular sieve composition may be formed from the gel in accordance with the steps set forth in process (I). The product may contain SAPO-31.

(V) Processes for forming SAPO-11 using colloidal silica with no added surfactant and no added solvent.

Silicoaluminophosphate gels of stoichiometry:

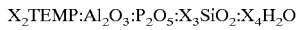

$X_2TEMP:Al_2O_3:P_2O_5:X_3SiO_2:X_4H_2O$ may be prepared by a method identical to method (I), above, except that no surfactant solution is used. An aqueous dispersion of water and the colloidal or fumed silica is used instead of the organic silicon source and surfactant solution. But for the absence of the surfactant and co-solvent, the molar ratios of the ingredients in the alumino phosphate mixture and the synthesis solution are as set forth in method (I), and as in that method, the mixing order of the ingredients is not critical.

A SAPO-11 molecular sieve composition may be formed from the gel in accordance with the steps set forth in process (1). The product may contain SAPO-31.

The preferred ECR-42 molecular sieve compositions are crystalline, and may be prepared with crystal sizes ranging from about 0.001 micrometers to about 1.0 micrometers. Preferably, crystal size ranges from about 0.01 micrometers to about 0.5 micrometers. The synthesis may be adjusted to prepare crystals of decreased size by diluting the synthesis solution with surfactant, co-solvent, and mixtures thereof. Small crystals may also be prepared by conventional methods such as seeding and high shear agitation rates.

B. Preferred ECR-42 Molecular Sieve Catalysts

The ECR-42 molecular sieve materials prepared in accordance with these methods are useful as catalytic materials. While not wishing to be bound, it is believed that the silicon distribution within the molecular sieve crystal, as measured for example by $^{29}$Si NMR, is one important characteristic influencing catalytic activity in SAPO materials. Since silicon is responsible for the acidity in SAPO materials, it is desirable that silicon be well dispersed in the aluminophosphate framework for high catalytic activity. Conventional SAPO molecular sieves may contain large silicon islands in the molecular sieve framework. Large silicon islands are undesirable because those silicon atoms at the interior of the islands are catalytically inactive. However, small Si islands are desirable because, it is believed, the strongest acid sites are formed at the borders of the Si islands and the aluminophosphate domains. The presence of these strong acid sites is believed to result from the silicons at the borders having fewer aluminum atoms as nearest neighbors, which would otherwise decreases acidity because aluminum has a lower electronegativity than silicon. The ECR-42 materials of this invention are believed to possess their desirable catalytic activity and selectivity because the Si atoms are well dispersed within the molecular sieve structure.

As is known to those skilled in the art, molecular sieve materials may possess an intrinsic or added catalytic functionality, and such materials are frequently referred to as "molecular sieve catalysts". Additional catalytic functionalities may be provided for molecular sieve materials by conventional methods. Such methods are applicable to the molecular sieves of this invention, and may be summarized as follows.

Accordingly, the molecular sieve material formed from the gel as set forth above may be calcined to remove the template. The sample may then be allowed to cool, preferably in a dry environment.

C. Structural Analysis of Preferred ECR-42 Molecular Sieve Catalysts

Figure 3:
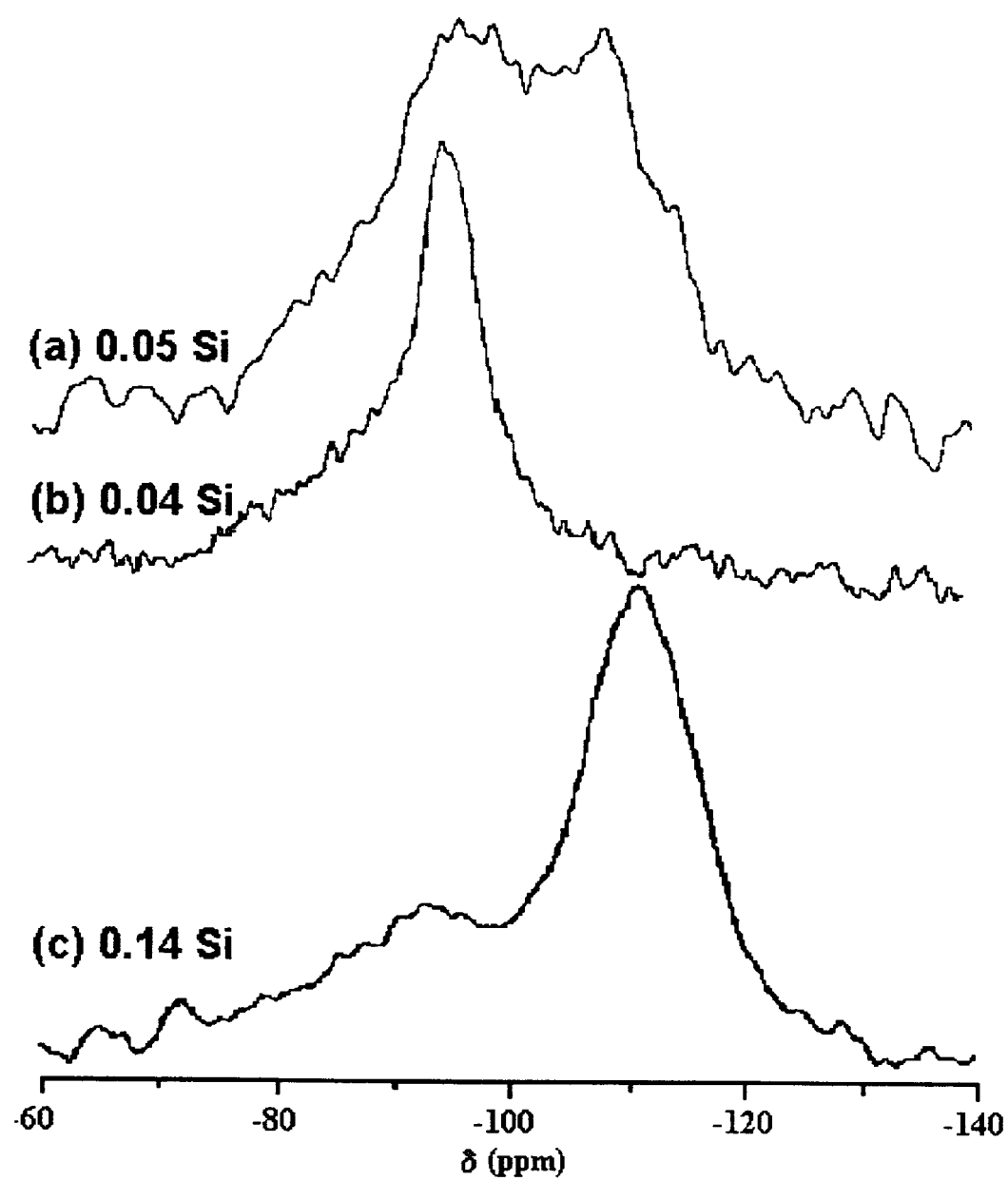
FIG. 3 shows the $^{29}$Si NMR spectra of conventionally prepared SAPO-11. Spectrum 3(a) shows a SAPO-11 of 5 molar percent Si having about ⅓ of the Si atoms located in silicon islands. Spectrum 3(b) is a SAPO-11 of 4 molar % Si having at most a small amount of Si located in Si islands, and spectrum 3(c) shows a SAPO-11 of 14 molar % Si having extensive Si island formation.

As discussed, the preferred ECR-42 compositions are different from SAPO-11 materials known in the art. Preferably, the ECR-42 compositions have a Si content ranging from above about 4 mol. % to about 20 mol. %, more preferably from about 5 mol. % to about 15 mol. %, and still more preferably from about 7 mol. % to about 15 mol %, the silicon content being based on the total amount of Si present in the framework of the molecular sieve composition. Preferably, more than about 50 molar %, and more preferably more than about 90 molar % of the silicon atoms present in the framework do not have four silicon atoms as nearest neighbors in the framework. See FIGS. 7(a), (b), and (c). FIG. 3 shows the NMR data for conventional SAPO-11 samples with Si contents over approximately the same range as the ECR-42 molecular sieve data in FIG. 7. A direct comparison of the figures shows that substantially less framework Si in the ECR-42 material is located in Si islands than in the conventional SAPO-11 over the entire range of Si concentration.

In a particularly preferred embodiment, the total molar fraction of silicon in the framework is greater than about 0.05, and the number of Si atoms having no Si nearest neighbor ranges from about 0 mol. % to about 100 mol. %, the number of Si atoms having one Si nearest neighbor ranges from about 5 mol. % to about 25 mol. %, the number of Si atoms having two Si nearest neighbors ranges from about 0 mol. % to about 35 mol. %, the number of Si atoms having three Si nearest neighbors ranges from about 0 mol. % to about 25 mol. %, and the number of Si atoms having four Si nearest neighbors ranging from about 0 mol. % to about 25 mol. %, the mol. % being based on the total silica in the ECR-42.

As is known by those skilled in the art, the distribution of silicon in SAPOs may be measured by $^{29}Si$ MAS NMR spectroscopy. For example, in SAPO-11, it is known that those silicon atoms having 4 aluminums and 0 silicons (4Al, 0Si) as nearest neighbors show as NMR resonance at −86 to −94 ppm chemical shift relative to tetramethylsiliane (TMS). Therefore, the molar percent of Si atoms with zero, one, two, three, and four Si atom nearest neighbors may be obtained, for example, by deconvoluting the integrated intensities from $^{29}Si$ NMR measurements, as illustrated in FIG. 2 and Table 1.

Figure 7:
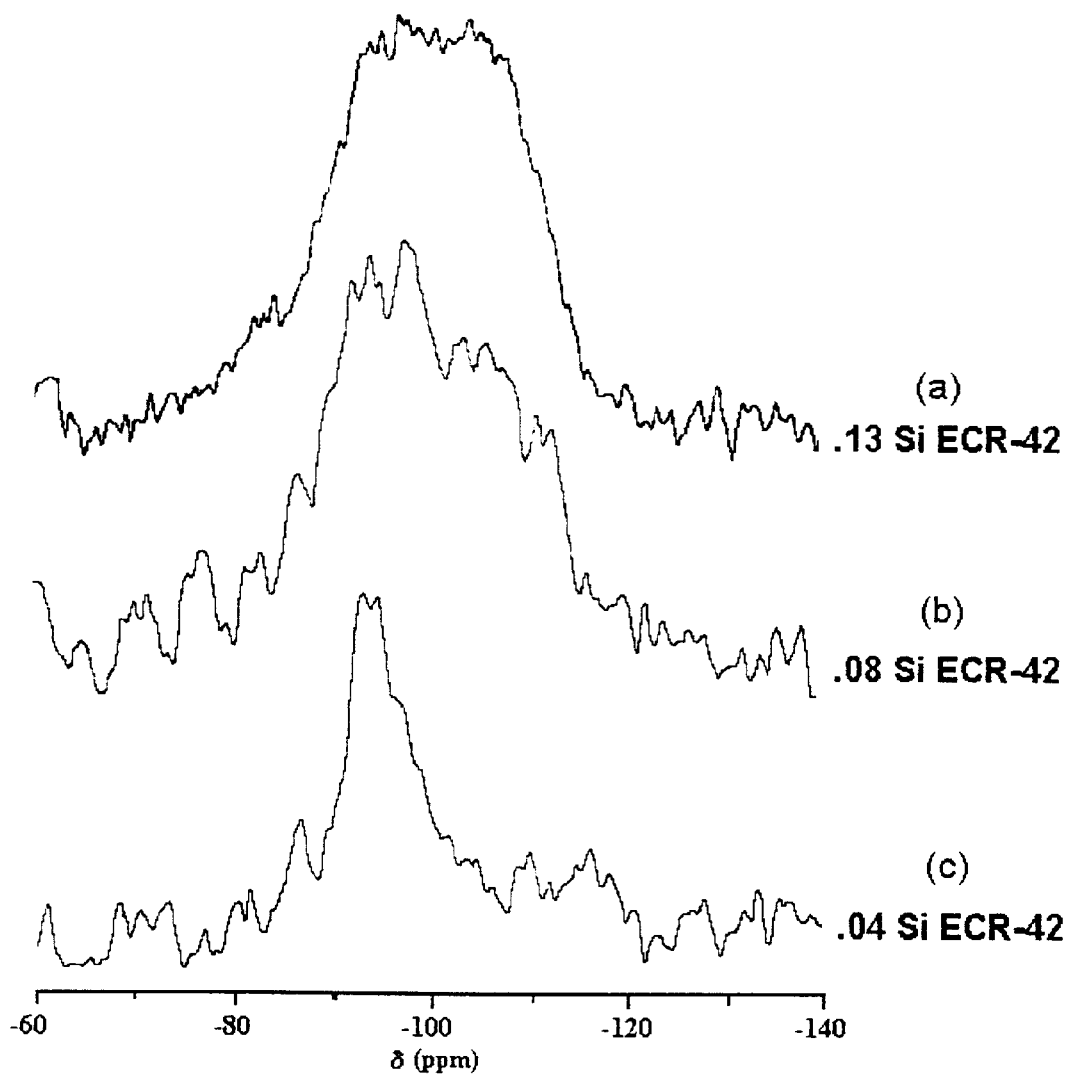
FIG. 7 shows the $^{29}$Si NMR spectra of ECR-42 having framework silicon in amounts ranging from about 5 molar % to about 13 molar %. Spectrum 7(a) shows ECR-42 with about 13 molar percent Si and having about 9% of the Si atoms located in silicon islands, representing a substantially reduced amount of framework Si in islands compared to conventional SAPO-11 of about the same Si content (FIG. 3(c). Spectrum 7(b) is of ECR-42 of example 6 containing about 7 molar % Si and having about 10% of the Si located in Si islands, and spectrum 7(c) shows a ECR-42 of example 1 containing about 4 molar % Si having about 4% of the Si located in Si islands.

Desirable Si distribution, as shown in the $^{29}Si$ NMR data of FIG. 7 for the preferred ECR-42 material, may be obtained in conventional SAPO-11 molecular sieve material, but only at Si concentrations of 4 wt. % or less. Such a low Si concentration leads to an undesirably diminished catalytic activity, but increasing Si concentration in conventional SAPO-11 leads to the formation of undesirable silicon islands, as shown in FIGS. 3(a) and (c).

TABLE 1

| Si Environment | 4Al, 0Si | 3Al, 1Si | 2Al, 2Si | 1Al, 3Si | 0Al, 4Si |
| --- | --- | --- | --- | --- | --- |
| Chemical shift in ppm from TMS | −86 to −94 ppm | −95 to −99 ppm | −100 to −105 ppm | −106 to −108 ppm | −109 to −115 ppm |

The preferred molecular sieves may contain Si concentrations as low as about 1 wt. %. It is often difficult to obtain high quality NMR data from samples of such a low concentration over the whole range of chemical shifts, and consequently some degree of uncertainty may be introduced into the deconvolutions required to determine the number of Si atoms with zero, one, two, three and four nearest neighbors. Nevertheless, the intensity of the −109 to −115 ppm region is sufficient in molecular sieve materials of even 1 wt. % to determine the approximate molar percent of Si framework atoms having four Si atom nearest neighbors, i.e., Si atoms located in the center of Si islands.

X-ray diffraction and electron microscopy may also be used to distinguish the preferred ECR-42 SAPOs from conventional SAPO-11. It is well known that powder X-ray diffraction may be used for determining crystallite size of materials less than about 1000 Å by the broadening of peaks in the X-ray diffraction pattern. When the shape of the crystallites is anisotropic (different dimensions in different directions), then the resulting powder diffraction pattern may have both broad and sharp peaks if one or two of the dimensions of the crystals are small enough to show peak broadening. Those reflections coming from Miller planes in the crystals corresponding to the short dimension will have broader peaks than those coming from Miller planes corresponding to the longer dimension will have sharper peaks.

Figure 4:
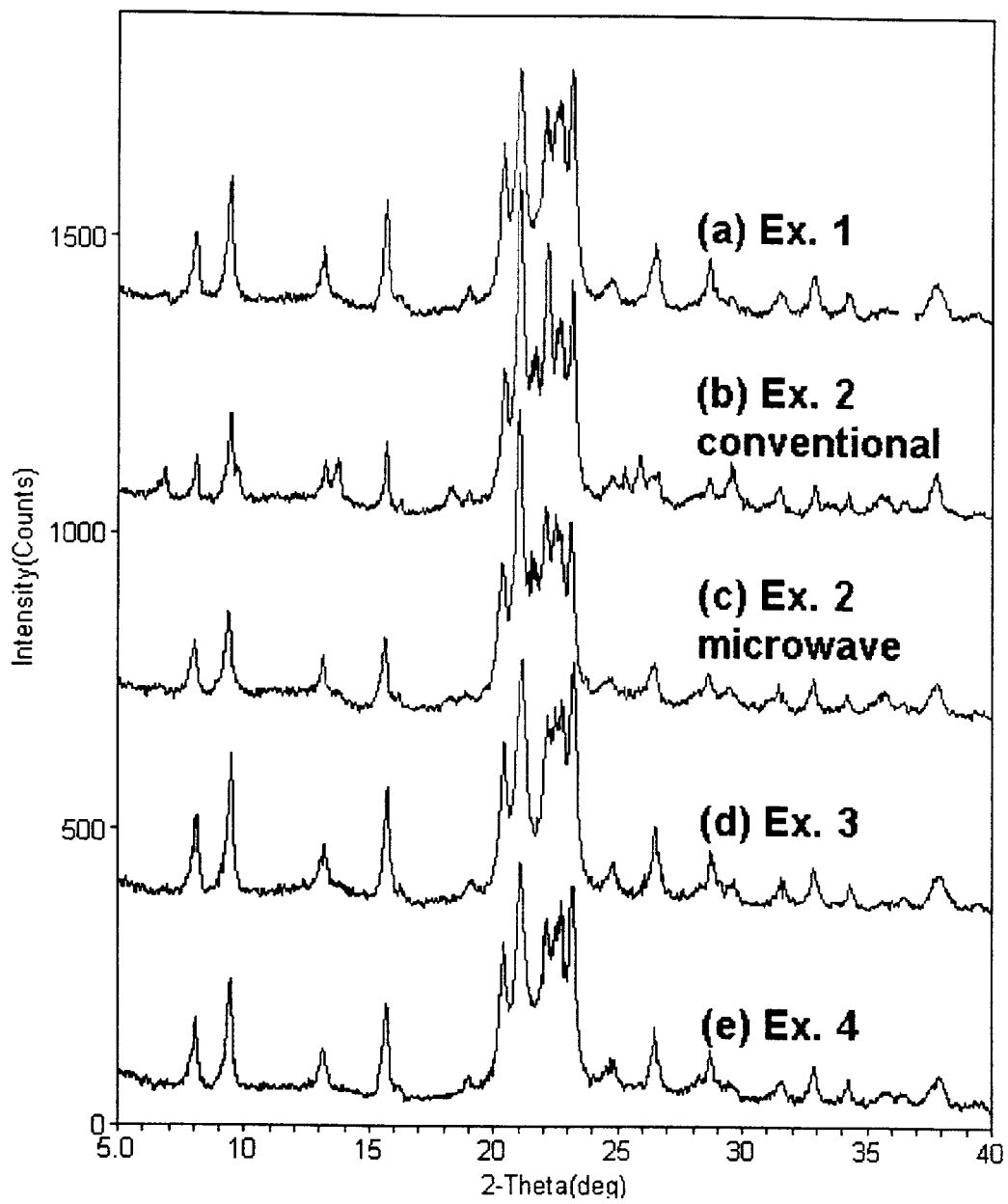
FIG. 4 shows powder x-ray diffraction data for the AEL-type SAPOs prepared in examples 1 through 4.

SAPO-11 has an orthorhombic crystal structure, a structure which is frequently associated with spatial anisotropies. The dimensions of the unit cell are a=8.4 Å, b=18.5 Å and c=13.5 Å, and the structure is such that the 10-ring channels run along the direction [100]. The preferred ECR-42 SAPOs may be identified with X-ray diffraction because the shape of the crystallite platelets have an a dimension that is significantly smaller than the b and c dimensions. Consequently, the X-ray diffraction pattern shows the peaks corresponding to the (h00) reflections to be smaller and broader than those of the (0k1) reflections, as shown in FIG. 4(a).

Figure 5:
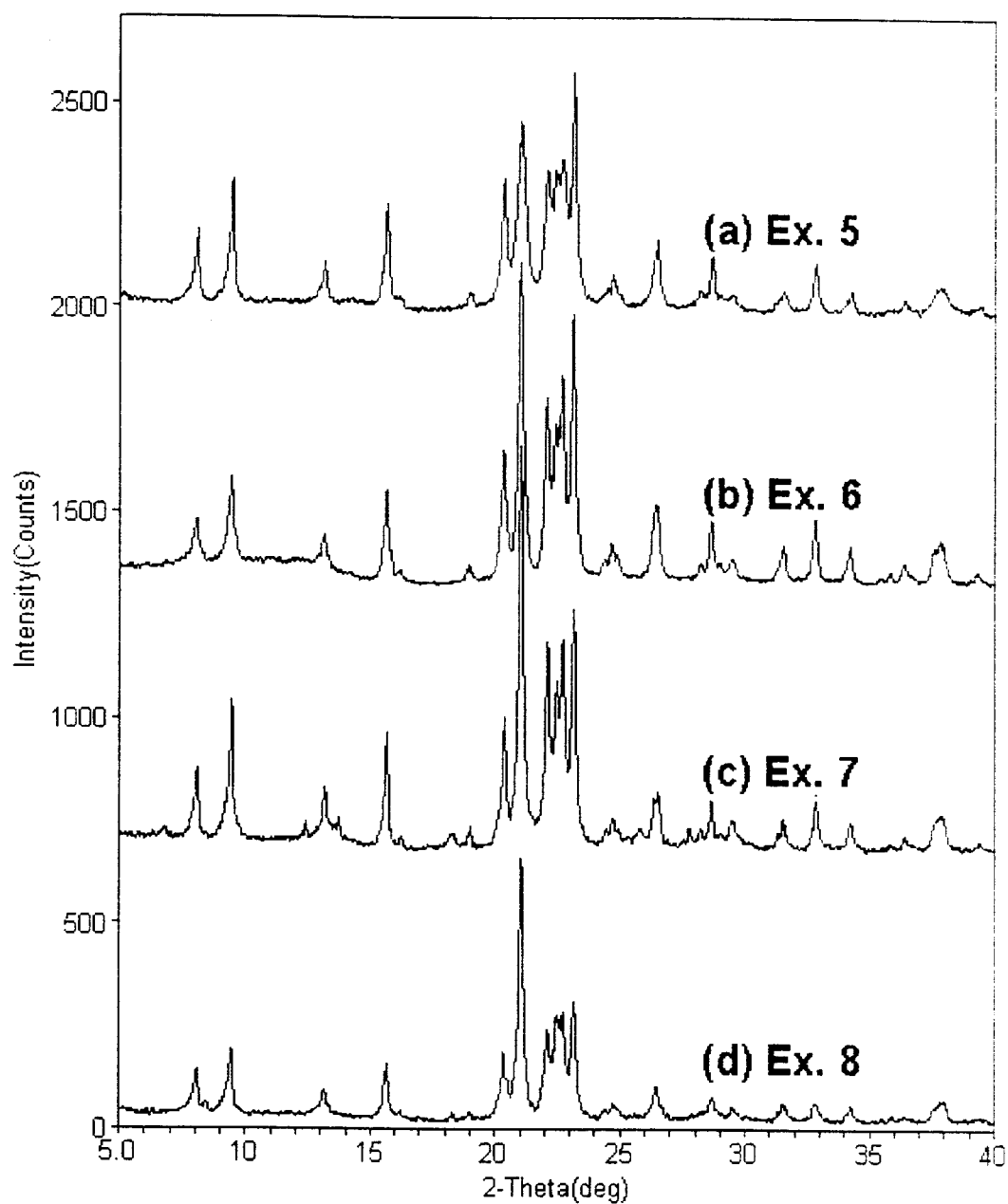
FIG. 5 shows powder x-ray diffraction data from AEL-type SAPOs of examples 5 through 8.

While not wishing to be bound by any model or theory, it is believed that an increased catalytic activity for a molecular sieve catalyst would result when a large number of channel openings are available to allow for efficient transportation of the reacting species and products to and from the active sites inside of, or at the pore mouth of, the molecular sieve crystal. The preferred ECR-42 SAPOs have this desirable spatial anisotropy, as shown in the powder x-ray diffraction results in FIGS. 4 and 5. The degree of spatial anisotropy can be controlled during synthesis by selecting the appropriate synthesis process. For example, the (200) reflections for the SAPOs prepared in accordance with process (I) (See FIGS. 4(a), (d), and (e), and FIG. 5(a)) are clearly broader in width and shorter in height than surrounding (0k1) reflections of the SAPOs prepared in accordance with processes (II) and (III) (see FIGS. 4(b) and (c) and FIG. 5(b)), and these in turn are broader that the (200) reflections observed for SAPOs prepared in accordance with processes (IV) and (V). See FIGS. 5(c) and (d). The (200) reflection is located at a scattering angle (2θ) of about 21.00 to about 21.2°, for copper Kα.

Figure 6:
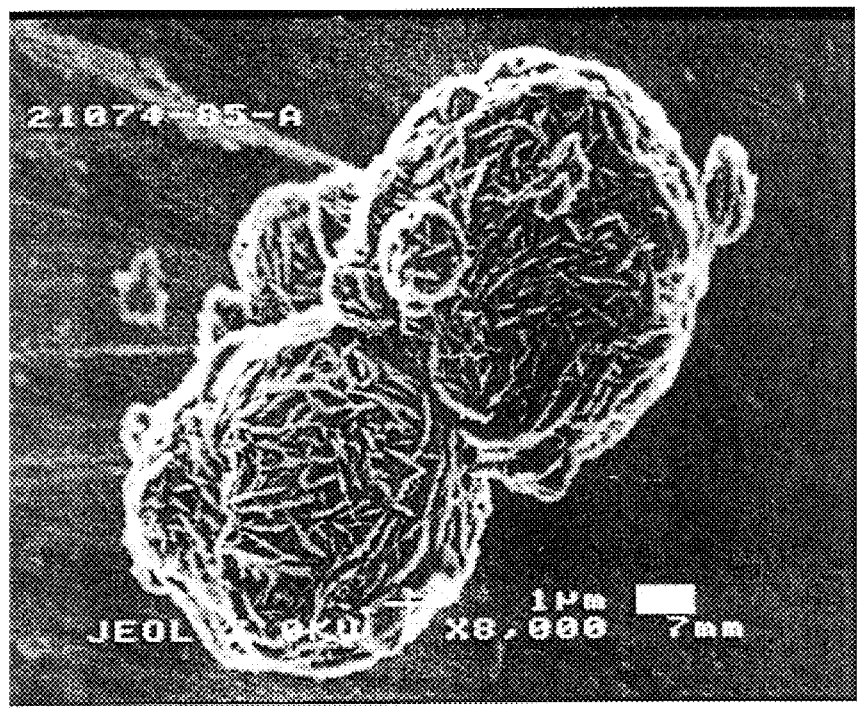
FIG. 6(a) shows scanning electron micrographs of an AEL-type SAPO prepared in accordance with the method of Example (4)
FIG. 6(b) shows an electron micrograph of conventionally-prepared SAPO-11.
Figure 6:
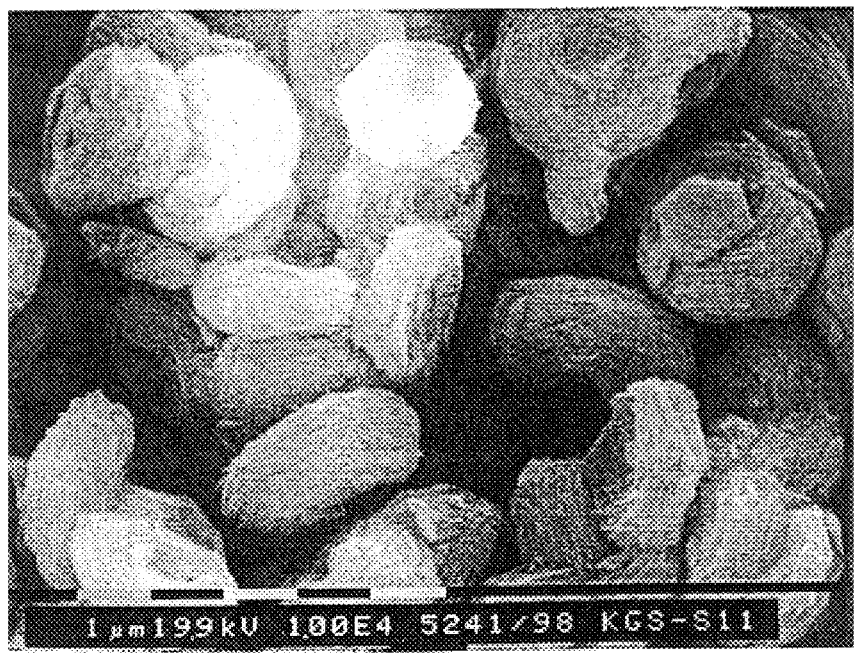

Electron microscopy may also be used to identify the ECR-42 molecular sieve. The SEM micrograph of FIG. 6(a) clearly shows the preferred thin platelets present in the product of process (I) compared to conventionally prepared SAPO shown in FIG. 6(b).

D. Use of Preferred ECR-42 Molecular Sieves as FCC Catalysts

The preferred ECR-42 catalytic molecular sieve compositions are useful as FCC catalysts, both alone and in combination with other FCC catalysts. The preferred compositions have an increased catalytic cracking activity compared with conventional SAPO-11 catalysts, without a substantial decrease in selectivity. Accordingly, the SAPO molecular sieve catalysts may be used in combination with a conventional, large-pore FCC catalyst. A preferred catalyst composition contains a major amount of the large pore FCC catalyst and a minor amount of the SAPO molecular sieve catalyst. More preferably, the conventional, large pore FCC catalyst is present in an amount ranging from about 50 wt. % to about 99 wt. %, and the SAPO molecular sieve catalyst is present in an amount ranging from about 1 wt. % to about 50 wt. %, the wt. % being based on the total weight of the FCC catalyst employed. Such catalysts have a dramatically increased catalytic activity for such processes over FCC catalysts containing SAPO molecular sieve catalysts prepared by conventional techniques.

The conventional FCC catalyst may be a composition of catalyst particles and other reactive and non-reactive components, such catalysts are described in European patent document No. 0 600 686A1, incorporated by reference herein.

The SAPO catalyst may be in the form of particles, and may include fines, inert particles, particles containing a metallic species, and mixtures thereof. Inert particles may contain species such as silica, alumina, clay, and mixtures thereof. More than one type of catalyst particle may be present in the catalyst. For example, individual catalyst particles may contain large pore molecular sieve catalyst, the ECR-42 molecular sieve catalyst, other shape selective molecular sieve such as zeolite, and mixtures thereof.

Preferred ECR-42 catalyst particles contain about 1 wt. % to about 60 wt. % of one or more SAPO molecular sieves, such as SAPO-11, SAPO-31, SAPO-41, and mixtures thereof.

The catalyst particles may contain an inorganic oxide matrix component for binding the particle's components together so that the catalyst particle product is hard enough to survive interparticle and reactor wall collisions. The inorganic oxide matrix may be made according to conventional methods from an inorganic oxide sol or gel which is dried to "glue" the catalyst particle's components together. Preferably, the inorganic oxide matrix is not catalytically active and comprises oxides of silicon and aluminum. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate.

The amount of molecular sieve in the catalyst particle will generally range from about 1 to about 60 wt. %, preferably from about 1 to about 40 wt. %, and more preferably from about 5 to about 40 wt. %, based on the total weight of the catalyst. Generally, in a fluid bed reactor the catalyst particle size will range from about 20 to 300 microns in diameter, with an average particle diameter of about 80 microns. The surface area of the matrix material will be about $\leq 350$ m$^2$/g, preferably 50 to 200 m$^2$/g, more preferably from about 50 to 100 m$^2$/g. While the surface area of the final catalysts will be dependent on such things as type and amount of SAPO and zeolite material used, it will usually be less than about 500 m$^2$/g, preferably from about 50 to 300 m$^2$/g, more preferably from about 50 to 250 m$^2$/g, and most preferably from about 100 to 250 m$^2$/g.

Conventional FCC catalysts useful in the invention also include catalysts containing a zeolite Y, zeolite beta, mixtures thereof, and catalysts containing a mixture of zeolite Y and a shape selective molecular sieve species such as ZSM-5, or a mixture of an amorphous acidic material and ZSM-5. Such catalysts are described in U.S. Pat. No. 5,318,692, incorporated by reference herein. The zeolite portion of the catalyst particle will typically contain from about 5 wt. % to 95 wt. % zeolite-Y (or alternatively the amorphous acidic material) and the balance of the zeolite portion being ZSM-5. Shape selective zeolite useful in the second catalyst include medium pore size molecular sieves such as ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. All of the above patents are incorporated herein by reference.

The large pore and shape selective catalysts may include "crystalline admixtures" which are thought to be the result of faults occurring within the crystal or crystalline area during the synthesis of the zeolites. Examples of crystalline admixtures of ZSM-5 and ZSM-11 are disclosed in U.S. Pat. No. 4,229,424 which is incorporated herein by reference. The crystalline admixtures are themselves medium pore, i.e., shape selective, size zeolites and are not to be confused with physical admixtures of zeolites in which distinct crystals of crystallites of different zeolites are physically present in the same catalyst composite or hydrothermal reaction mixtures.

As discussed, one aspect of the invention is the use of an effective amount of the ECR-42 molecular sieve catalysts of the invention in catalytic cracking processes, especially in FCC processes for producing naphtha and $C_2$ to $C_4$ olefins. Suitable FCC conditions and the types of feeds that may be used therein are as follows.

Suitable hydrocarbonaceous feeds for catalytic cracking include naphtha; hydrocarbonaceous oils boiling in the range of about 221° C. to about 566° C., such as gas oil; heavy hydrocarbonaceous oils comprising materials boiling above 566° C.; heavy and reduced petroleum crude oil; petroleum atmospheric distillation bottoms; petroleum vacuum distillation bottoms; pitch; asphalt; bitumen; other heavy hydrocarbon residues; tar sand oils; shale oil; liquid products derived from coal liquefaction processes; and mixtures thereof.

The cracking process of the present invention may be performed in one or more conventional FCC process units under conventional FCC conditions in the presence of the catalyst of this invention. Each unit comprises a riser reactor having a reaction zone, a stripping zone, a catalyst regeneration zone, and at least one fractionation zone. The feed is conducted to the riser reactor where it is injected into the reaction zone wherein the heavy feed contacts a flowing source of hot, regenerated catalyst. The hot catalyst vaporizes and cracks the feed at a temperature from about 500° C. to about 650° C., preferably from about 500° C. to about 600° C. The cracking reaction deposits carbonaceous hydrocarbons, or coke, on the catalyst, thereby deactivating the catalyst. The cracked products may be separated from the coked catalyst and a portion of the cracked products may be conducted to a fractionator. The fractionator separates at least a naphtha fraction from the cracked products.

The coked catalyst flows through the stripping zone where volatiles are stripped from the catalyst particles with a stripping material such as steam. The stripping may be preformed under low severity conditions in order to retain adsorbed hydrocarbons for heat balance. The stripped catalyst is then conducted to the regeneration zone where it is regenerated by burning coke on the catalyst in the presence of an oxygen containing gas, preferably air. Decoking restores catalyst activity and simultaneously heats the catalyst to, e.g., 650° C. to 750° C. The hot catalyst is then recycled to the riser reactor at a point near or just upstream of the second reaction zone. Flue gas formed by burning coke in the regenerator may be treated for removal of particulates and for conversion of carbon monoxide, after which the flue gas is normally discharged into the atmosphere.

The feed may be cracked in the reaction zone under conventional FCC conditions in the presence of the catalyst of this invention. Preferred process conditions in the reaction zone include temperatures from about 500° C. to about 650° C., preferably from about 525° C. to 600° C.; hydrocarbon partial pressures from about 10 to 40 psia, preferably from about 20 to 35 psia; and a catalyst to feed (wt/wt) ratio from about 3 to 12, preferably from about 4 to 10; where catalyst weight is total weight of the catalyst composite. Though not required, it is also preferred that steam be concurrently introduced with the feed into the reaction zone, with the steam comprising up to about 10 wt. %, and preferably ranging from about 2 wt. % to about 3 wt. % of the feed. Also, it is preferred that the feed's residence time in the reaction zone be less than about 10 seconds, for example from about 1 to 10 seconds.

In one embodiment of the invention, it may be desirable to define an olefin cracking index ("OCI") defined as the WHSV required to achieve 80% olefin conversion of a model feed of about 50 wt. % hexane and about 50 wt. % hexene in a catalytic cracking process using the preferred ECR-42 molecular sieve catalysts at a temperature of about 575° C. In a preferred embodiment, the OCI index ranges from about 150 to about 5000 $hr^{-1}$.

In summary, it has been discovered that when ECR-42 molecular sieves are synthesized in accord with the methods of this invention and following the procedure described herein, that the distribution of Si (and therefore the total number and strength of acid sites) is quite different, and much higher, than those of conventional SAPO-11. It has also been discovered that the preferred molecular sieves (particularly the small crystal molecular sieves, are extremely active and selective for carrying out FCC reactions such as gas oil, high olefin, and naphtha cracking for naphtha and light olefin production.

The invention is further exemplified by the following non-limiting examples.

EXAMPLES

I. Preparation of the Preferred ECR-42 Molecular Sieves

Example 1

Preparation of ECR-42 using surfactant, ethanol co-solvent, and microwave heating.

A silicoaluminophosphate gel of stoichiometry:

.16CA: DPA: $Al_2O_3$: $P_2O_5$: 0.2 $SiO_2$: 50.3 $H_2O$: 7.3 ethanol (where CA is hexadecylamine) was prepared by mechanically mixing together 28.6 grams of $H_3PO_4$(85%), 25 grams of water and 17 grams of Catapal B alumina (Vista Chemical Co., Houston, Tex. 74%$Al_2O_3$, 26% $H_2O$ for 45 min. in a 500 ml Teflon bottle until homogenous. To this mixture was added 12.7 grams of DPA, and the mixture was then stirred for 30 minutes. A surfactant solution was prepared by mixing 2.4 grams of hexadecylamine in 20.8 grams of ethanol and 12.5 grams of water. This solution was added to half of the di-n-propylamine/aluminophosphate mixture along with 2.6 grams of TEOS and 11.2 grams of water. The resulting mixture was stirred for about 3 min. in a 125 ml blender. This gel was divided between three CEM XP-1500 Teflon microwave autoclaves (about 28.5 grams each), available from CEM Corp., Matthews, N.C. The three autoclaves were heated for 5 min. in a microwave oven to a pressure of 485 psi. After 5, 30 and 60 min. at 485 psi the samples were removed from the oven. The ECR-42 products were recovered by centrifigation and washed twice with ethanol and then twice with de-ionized water. The resulting products were dried in an air oven at 115° C. and the powder X-ray diffraction pattern measured which showed the products to be pure SAPO-11, see FIG. 4(a). Elemental analysis of the 60 min. sample gave: 17.3% Al; 17.0% P; 1.68% Si, representing a product stoichiometry of $Si_{.05}Al_{.51}P_{.44}$.

Example 2

Preparation of ECR-42 using surfactant, hexanol co-solvent, and microwave heating.

A silicoaluminophosphate gel of stoichiometry:

.16 CA: DPA: $Al_2O_3$: $P_2O_5$: 0.4 $SiO_2$: 39 $H_2O$:4.5 hexanol (where CA is hexadecylamine) was prepared by mechanically mixing together 28.6 grams of $H_3PO_4$(85%), 25 grams of water and 17 grams of Catapal B alumina (Vista, 74%$Al_2O_3$, 26% $H_2O$) for 2 hr. in a 500 ml Teflon bottle until homogenous. To this mixture was added 12.7 grams of DPA and the mixture was then stirred for 30 minutes. A surfactant solution was prepared by mixing 4.8 grams of hexadecylamine in 56.9 grams of hexanol and 25 grams of water. This solution was added to the di-n-propylamine/aluminophosphate mixture along with 10.3 grams of TEOS and 22.3 grams of water. The resulting mixture was stirred for about 3 min. in a 125 ml blender. This gel was divided between two 125 ml Teflon-lined autoclaves and a CEM XP-1500 Teflon microwave autoclave (about 28.5 grams).

The two autoclaves were heated at 195° C. for 24 and 40 hrs. in a conventional oven. The microwave autoclave was heated for 5 min. in a microwave oven to a pressure of 485 psi. After 60 min. at 485 psi the sample was removed from the oven. The products were recovered by centrifugation and washed twice with ethanol and then twice with de-ionized water. The resulting ECR-42 products were dried in an air oven at 11 5° C. and the powder X-ray diffraction pattern measured showed that the product of the microwave heating was pure SAPO-11 (FIG. 4(c)) and the product of the conventionally heated samples to be SAPO-11 and SAPO-41 (FIG. 4(b)). Elemental analysis of the microwave heated sample gave: 14.5% Al; 16.4% P; 2.84% Si, representing a product stoichiometry of $Si_{.09}Al_{.46}P_{.45}$ and the conventionally heated sample (40 hrs.) gave 15.4% Al; 16.4% P; 3.36% Si, representing a product stoichiometry of $S_{.10}Al_{.47}P_{.43}$.

Example 3

Preparation of ECR-42 using surfactant, ethanol co-solvent, and microwave heating.
A silicoaluminophosphate gel of stoichiometry:

.16 CA: DPA: $Al_2O_3$: $P_2O_5$: 0.2 $SiO_2$: 39.1 $H_2O$: 7.3 ethanol (where CA is hexadecylamine) was prepared by mechanically mixing together 71.5 grams of $H_3PO_4$(85%), 62.5 grams of water and 42.4 grams of Catapal B alumina (Vista, 74%$Al_2O_3$, 26% $H_2O$) for 45 min. in a 1000 ml Teflon bottle until homogenous. To this mixture was added 31.7 grams of DPA and the mixture was then stirred for 30 minutes. A surfactant solution was prepared by mixing 12 grams of hexadecylamine in 104 grams of ethanol and 62.5 grams of water. This solution was added to the di-n-propylamine/aluminophosphate mixture along with 13 grams of TEOS and 56 grams of water. The resulting mixture was stirred for about 3 min. in a 250 ml blender. One half of this gel was divided between five CEM XP-1500 Teflon microwave autoclaves (about 42.5 grams each). The five autoclaves were heated for 10 min. in a microwave oven to a pressure of 485 psi. After 30 min. at 485 psi the samples were removed from the oven. The ECR-42 products were combined and then recovered by centrifugation and washed twice with ethanol and then twice with de-ionized water. The resulting product was dried in an air oven at 115° C. and the powder X-ray diffraction pattern measured which showed the product to be pure SAPO-11. See FIG. 4(d). Elemental analysis gave: 15.96% Al; 17.3% P; 1.638% Si, representing a product stoichiometry of $Si_{.05}Al_{.49}P_{.46}$.

Example 4

Preparation of ECR-42 using surfactant, ethanol co-solvent and microwave heating.
A silicoaluminophosphate gel of stoichiometry:

.16 CA: DPA: $Al_2O_3$: $P_2O_5$: 0.4 $SiO_2$: 39.1 $H_2O$: 7.3 ethanol (where CA is hexadecylamine) was prepared by adding 6.5 grams more of TEOS to the second half of the gel prepared in Example 3. After thoroughly homogenizing in a blender this gel was divided between five CEM XP-1500 Teflon microwave autoclaves (about 42.5 grams each. The five autoclaves were heated for 10 min. in a microwave oven to a pressure of 485 psi. After 30 min. at 485 psi the samples were removed from the oven. The ECR-42 products were combined and then recovered by centrifugation and washed twice with ethanol and then twice with de-ionized water. The resulting product was dried in an air oven at 11 5° C. and the powder X-ray diffraction pattern measured which showed the product to be pure SAPO-11. See FIG. 4(e). Elemental analysis gave: 15.23% Al; 17.2% P; 2.795% Si, representing a product stoichiometry of $Si_{.08}Al_{.46}P_{.46}$.

Example 5

Preparation of ECR-42 using surfactant, ethanol co-solvent, and conventional heating.
A silicoaluminophosphate gel of stoichiometry:

.16 CA: 2 DPA: $Al_2O_3$: $P_2O_5$: 0.4 $SiO_2$: 40 $H_2O$: 7.5 ethanol (where CA is hexadecylamine) was prepared by mixing together 25.4 grams of $H_3PO_4$(85%), 35 grams of water, and 15.2 grams of Catapal A alumina (Vista, 74%$Al_2O_3$, 26% $H_2O$) for 2 min. in a 250 ml plastic beaker. To this mixture was added 22.3 grams of DPA and the mixture was then stirred for 3 minutes. A surfactant solution was prepared by mixing 4.25 grams of hexadecylamine in 38.1 grams of ethanol for thirty minutes. This solution was added to the di-n-propylamine/aluminophosphate mixture along with 9.18 grams of TEOS and 30.6 grams of water. The resulting mixture was homogenized for about 5 min. in a 250 ml blender. About 80 g of this gel was placed in a 125 Teflon lined autoclave. The autoclave was heated for 24 hours in an air oven at 195° C. After cooling, the ECR-42 product was recovered by centrifugation and washed twice with ethanol and then twice with de-ionized water. The resulting product was dried in an air oven at 115° C. and the powder X-ray diffraction pattern measured which showed the product to be pure SAPO-11, see FIG. 5(a). Elemental analysis gave: 17.2% Al; 17.1% P; 3.052% Si, representing a product stoichiometry of $Si_{.084}Al_{.491}P_{.425}$.

Example 6

Preparation of ECR-42 using TEOS, ethanol co-solvent and conventional heating.
A silicoaluminophosphate gel of stoichiometry:

2 DPA: $Al_2O_3$: $P_2O_5$: 0.4 $SiO_2$: 40 $H_2O$: 7.5 ethanol was prepared by mixing together 28.9 grams of $H_3PO_4$ (85%), 40 grams of water and 17.3 grams of Catapal A alumina (Vista, 74%$Al_2O_3$, 26% $H_2O$) for 2 min. in a 250 ml plastic beaker. To this mixture was added 25.4 grams of DPA and the mixture stirred for 3 minutes. To the di-n-propylamine/aluminophosphate mixture was added 43.3 grams of ethanol with 10.4 grams of TEOS and 34.7 grams of water. The resulting mixture was homogenized for about 5 min. in a 250 ml blender. About 80 g of this gel was placed in a 125 Teflon lined autoclave. The autoclave was heated for 24 hours in an air oven at 195° C. After cooling, the ECR-42 product was recovered by centrifugation and washed once with ethanol and then three times with de-ionized water. The resulting product was dried in an air oven at 115° C. and the powder X-ray diffraction pattern measured which showed the product to be pure SAPO-11. See FIG. 5(b). Elemental analysis gave: 17.94% Al; 20.1% P; 2.56% Si, representing a product stoichiometry of $Si_{.065}Al_{.473}P_{.462}$.

Example 7

Preparation of ECR-42 using TEOS and conventional heating.
A silicoaluminophosphate gel of stoichiometry:

1.5 DPA: $Al_2O_3$: $P_2O_5$: 0.4 $SiO_2$: 50 $H_2O$ was prepared by mixing together 25.1 grams of $H_3PO_4$ (85%), 36 grams of water and 15 grams of Catapal A alumina (Vista, 74%$Al_2O_3$, 26% $H_2O$) for 2 min. in a 250 ml plastic beaker. To this mixture was added 16.5 grams of DPA, and the mixture was stirred for 3 minutes. To the di-n-propylamine/aluminophosphate mixture was added 9.1 grams of TEOS (tetraethylorthosilicate) and 48.4 grams of water. The resulting mixture was homogenized for about 5 min. in a 250 ml blender. One half of this gel was placed in a 125 Teflon-lined autoclave. The autoclave was heated for 24 hours in an air oven at 220° C. After cooling, the ECR-42product was recovered by centrifugation and washed four times with de-ionized water. The resulting product was dried in an air oven at 115° C. and the powder X-ray diffraction pattern measured which showed the product to be SAPO-11 and SAPO-41. See FIG. 5(c). Elemental analysis gave: 18.8% Al; 19.7% P; 2.70% Si, representing a product stoichiometry of $Si_{.067}Al_{.49}P_{.445}$.

Example 8
Preparation of SAPO-11 using colloidal silica.
A silicoaluminophosphate gel of stoichiometry:

1.5 DPA: $Al_2O_3$: $P_2O_5$: 0.4 $SiO_2$: 50$H_2O$ was prepared by mixing together 31.4 grams of $H_3PO_4$ (85%), 80 grams of water and 18.8 grams of Catapal B alumina (Vista, 74%$Al_2O_3$, 26% $H_2O$) and mechanically stirring for 0.5 hour in a 500 ml Teflon bottle. To this mixture was added 20.7 grams of DPA (di-n-propylamine) and 8.19 g solution of aqueous colloidal silica (duPont Ludox AS-40, 40% $SiO_2$) and stirred for 1.5 hours. Finally, 20.9 grams of water were added, and the resulting mixture was homogenized for about 5 min. in a 250 ml blender. This gel was divided between two 125 Teflon lined autoclaves. The autoclaves were heated for 24 hours in an air oven at 195° C. After cooling, the products were combined and then recovered by centrifugation and washed four times with de-ionized water. The resulting product was dried in an air oven at 115° C. and the powder X-ray diffraction pattern measured which showed the product to be SAPO-11 and SAPO-31. See FIG. 5(d). Elemental analysis gave a product stoichiometry of $Si_{0.056}Al_{0.502}P_{0.442}$.

Example 9
Use of the ECR-42 as FCC molecular sieve catalysts.

To illustrate the superior selectivity of SAPO-11 as a FCC additive for generation of propylene, a series of tests was carried out with a SAPO-11, which was synthesized in the conventional manner, and a commercial ZSM-5 additive catalyst. The tests were carried out with a conventional large pore zeolite catalyst as the base cracking catalyst. The sample containing the ZSM-5 additive catalyst contained 10 wt. % ZSM-5 and 90 wt. % conventional large pore FCC catalyst. The sample containing conventional SAPO-11 catalyst contained 25 wt. % SAPO-11 and 75 wt. % conventional large pore zeolite catalyst. The tests were carried out at 511° C., 2.5–5.0 catalyst to oil ratio with a heavy gas oil feed.

As can be seen from the data presented in Table 2, even conventionally prepared SAPO-11 is a selective catalyst for olefin generation. At 74–75 wt. % conversion, the propylene-to-butylene ratio from addition of conventional SAPO-1 is 3.0, which compares favorably to the conventional ZSM-5 additive catalyst, which showed a propylene-to-butylene ratio of 1.3. In addition to the superior propylene-to-butylene selectivity, the propane and butane light saturate yields were also lower with conventional SAPO-11.

Although highly selective, the conventional SAPO-11 showed lower activity than the ZSM-5 additive catalyst, as is shown by the naphtha yield reduction of 0.9 wt. % when the conventional SAPO-11 was used as an FCC additive. This contrasts with the ZSM-5 additive, which reduced naphtha yield by 4.0 wt. %. From these data, one can estimate that the ZSM-5 additive catalyst is about four times more active than conventional SAPO-11.

As can be seen from Table 3, the preferred ECR-42 material prepared in example 5 is substantially more active than conventional SAPO-11. The conventional SAPO-11 showed 42–44 wt. % conversion at a WHSV of 14 $hr^{-1}$ in cracking of a model feed containing 50 wt. % hexane and 50 wt. % hexene at 575° C. The ECR-42 molecular sieve catalyst showed 43 wt. % conversion at 600 $hr^{-1}$ WHSV. From these data, it can be estimated that the preferred ECR-42 SAPO is 40 times more active than conventional SAPO-11. Equally important, the conventional SAPO-11 and the preferred ECR-42 SAPO catalyst are equally selective, at about, in spite of the tremendous activity difference.

TABLE 2

| Catalyst | Conventional ZSM-5 | Conventional SAPO-11 |
|---|---|---|
| Naphtha, Wt % | −4.0 | −0.9 |
| Key Results, Wt % | | |
| Propylene | 2.1 | 0.9 |
| Butenes | 1.6 | 0.3 |
| Propane | 0.1 | −0.2 |
| Butanes | 0.8 | 0.0 |
| Selectivity, % | | |
| C3=/C4= Ratio | 1.3 | 3.0 |

All data shown are delta yields at 74–75 wt % conversion

TABLE 3

| Catalyst | Conventional SAPO-11 | ECR-42 SAPO |
|---|---|---|
| WHSV, Hr-1 | 14 | 600 |
| Conversion, Wt % | 44.3 | 43.2 |
| Key Results, Wt % | | |
| Ethylene | 2.4 | 2.3 |
| Propylene | 32.8 | 32.8 |
| Butenes | 5.0 | 5.7 |
| Lt Sats | 3.0 | 2.4 |
| Selectivity, % | | |
| Propylene | 74.0 | 75.9 |

Examples 10
Preparation of ECR-42 using various alcohol co-solvents and tetraalkylorthosilicates.
A series of silicoaluminophosphate gels of stoichiometry:

$X_1CA$: 2 DPA: $Al_2O_3$: $P_2O_5$: 0.4 $SiO_2$: 40 $H_2O$: $X_5$ SOL where CA is hexadecylamine and DPA is di-n-propylamine) were prepared by mixing together the appropriate amounts of $H_3PO_4$ (85%), water and Catapal A alumina (Vista, 74%$Al_2O_3$, 26% $H_2O$) for 2 min. in a 250 ml plastic beaker. To this mixture was added the appropriate amount of DPA (di-n-propylamine) and the mixture stirred for 3 minutes. Then the appropriate amount of alcohol, tetraalkylorthosilicate and water were added to obtain the stoichiometry as indicated in Table 1. The resulting mixtures were homogenized for about 5 min. in a 250 ml blender. One half of this mixture was transferred to 125 Teflon-lined autoclave. To the other half was mixed in 1.5 grams of hexadecylamine and also transferred to 125 Teflon-lined autoclave. The autoclaves were heated for 24 hours in an air oven at 195° C. After cooling the product was recovered by centrifugation and washed twice with ethanol and then twice with de-ionized water. The resulting products were dried in an air oven at 115° C. and the powder X-ray diffraction patterns measured which showed the products to be pure ECR-42. Elemental analyses and product stoichiometries are listed in Table 4.

TABLE 4

| Experiment Number | $X_1$ | $X_5$ | SOL | Si Source |
|---|---|---|---|---|
| 9  | 0   | 11.5 | methanol  | tetraethylorthosilicate |
| 10 | .16 | 11.5 | methanol  | tetraethylorthosilicate |
| 11 | 0   | 6.1  | n-propanol | tetraethylorthosilicate |
| 12 | .16 | 6.1  | n-propanol | tetraethylorthosilicate |
| 13 | 0   | 6.1  | i-propanol | tetraethylorthosilicate |
| 14 | .16 | 6.1  | i-propanol | tetraethylorthosilicate |
| 15 | 0   | 5.0  | n-butanol | tetraethylorthosilicate |
| 16 | .16 | 5.0  | n-butanol | tetraethylorthosilicate |
| 17 | 0   | 8    | ethanol   | tetramethylorthosilicate |
| 18 | .16 | 8    | ethanol   | tetramethylorthosilicate |
| 19 | 0   | 8    | ethanol   | tetrapropylorthosilicate |
| 20 | .16 | 8    | ethanol   | tetrapropylorthosilicate |

TABLE 5

| Experiment Number | % Si | % Al | % P | Molar Si | Molar Al | Molar P |
|---|---|---|---|---|---|---|
| 9  | 3.213 | 18.40 | 19.37 | 0.080 | 0.480 | 0.440 |
| 10 | 3.870 | 17.63 | 13.68 | 0.112 | 0.530 | 0.358 |
| 11 | 2.813 | 20.73 | 22.22 | 0.063 | 0.484 | 0.452 |
| 12 | 3.542 | 18.27 | 15.00 | 0.098 | 0.526 | 0.376 |
| 13 | 3.147 | 18.09 | 19.42 | 0.080 | 0.476 | 0.445 |
| 14 | 3.550 | 18.65 | 15.23 | 0.097 | 0.528 | 0.376 |
| 15 | 2.668 | 18.60 | 19.70 | 0.067 | 0.485 | 0.448 |
| 16 | 3.360 | 19.38 | 15.78 | 0.089 | 0.533 | 0.378 |
| 17 | 3.148 | 18.31 | 19.35 | 0.079 | 0.479 | 0.441 |
| 18 | 4.194 | 18.35 | 12.98 | 0.120 | 0.545 | 0.336 |
| 19 | 3.124 | 18.00 | 19.24 | 0.079 | 0.477 | 0.444 |
| 20 | 3.730 | 19.52 | 15 90 | 0.097 | 0.528 | 0.375 |

Example 11

The materials of experiments 1–20 were subject to $^{29}$Si MAS NMR to determine the relative amounts of silicon in the five different environments, i.e., Si(4Si), Si(3Si), Si(2Si), Si(1Si), Si(0Si). The $^{29}$Si Magic-angle spinning (MAS) nuclear magnetic resonance (NMR) spectra with proton decoupling were recorded on a Chemagnetics CMXII 500 spectrometer at 99.3 MHz using a 7.5 mm probe spinning at 6 kHz. Typical run conditions were: 800 to 10000 acquisitions; 4 or 5 sec. pulse width; 60 to 120 sec. relaxation delay. Chemical shifts were measured relative to tetramethylsilane (TMS). The spectra were then deconvoluted into the five silicon environments. The molar fractions of each silicon environment are given in Table 6.

TABLE 6

| Example | 4Al, 0Si | 3Al, 1Si | 2Al, 2Si | 1Al, 3Si | 0Al, 4Si |
|---|---|---|---|---|---|
| 1  | 54 | 21 | 13 | 9  | 4  |
| 2  |    |    |    |    |    |
| 3  |    |    |    |    |    |
| 4  |    |    |    |    |    |
| 5  | 49 | 19 | 16 | 11 | 5  |
| 6  | 33 | 22 | 22 | 13 | 10 |
| 7  |    |    |    |    |    |
| 8  | 36 | 17 | 7  | 17 | 23 |
| 9  | 24 | 31 | 18 | 18 | 9  |
| 10 | 24 | 44 | 15 | 14 | 3  |
| 11 |    |    |    |    |    |
| 12 |    |    |    |    |    |
| 13 | 32 | 32 | 22 | 5  | 9  |
| 14 | 41 | 31 | 6  | 12 | 10 |
| 15 |    |    |    |    |    |
| 16 |    |    |    |    |    |
| 17 | 35 | 15 | 10 | 18 | 22 |
| 18 |    |    |    |    |    |
| 19 |    |    |    |    |    |
| 20 |    |    |    |    |    |

What is claimed is:

1. A composition comprising a major amount of a large-pore zeolite catalyst and a minor amount of a molecular sieve composition with a framework tetrahedra of silicon, aluminum, and phosphorus, the molecular sieve having a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the silicon present in the molecular sieve and the conventional SAPO-11 is distributed among sites in the framework tetrahedra, each site having a first, a second, a third, and a fourth nearest neighbor position, and each nearest neighbor position being independently occupied by one atom selected from silicon and aluminum, and the molecular sieve has a substantially smaller number of silicon sites having silicon atoms all four nearest neighbor positions than the conventional SAPO-11 having the same total silicon amount.

2. The composition of claim 1 wherein the molecular sieve composition's Si content ranges from about 5 mol. % to about 15 mol. %.

3. The composition of claim 2 wherein the number of Si atoms in the framework having three Si nearest neighbors ranges from about 0 mol. % to about 25 mol. %, and the number of Si atoms having four Si nearest neighbors ranges from about 0 mol. % to about 50 mol. %, the mol. % being based on the total amount of silicon in the framework.

4. The composition of claim 3 wherein the molecular sieve has a crystal size ranging from about 0.001 micrometers to about 1.0 micrometers.

5. The composition of claim 4 wherein the molecular sieve is in the form of platelets having a first thickness in the direction and a second thickness in the direction, the second thickness being greater than the first thickness, and the first thickness being less than 50 nm.

6. The composition of claim 5 the number of Si atoms having four Si nearest neighbors ranging from about 0 mol. % to about 25 mol. %.

7. The composition of claim 6 wherein the molar % of framework silicon atoms having aluminum atom nearest neighbors is measured by $^{29}$Si MAS NMR.

8. The composition of claim 7 wherein the molecular sieve composition contains one or more of SAPO-31 and SAPO-41.

9. The composition of claim 8 the number of Si atoms having four Si nearest neighbors ranging from about 0 mol. % to about 10 mol. %.

10. The composition of claim 1 wherein the conventional, large pore zeolite catalyst is present in an amount ranging from about 50 wt. % to about 99 wt. %, and the SAPO molecular sieve catalyst is present in an amount ranging from about 1 wt. % to about 50 wt. %, the wt. % being based on the total weight of the molecular sieve in the composition.

11. The composition of claim 1 wherein the SAPO molecular sieve is contained in a particle wherein the amount of molecular sieve in the particle ranges from about 1 to about 60 wt. %, based on the total weight of the particle, wherein the particle's diameter ranges from about 20 to 300 microns, wherein the particle contains a matrix material, and wherein the particle has a surface area less than about 500 $m^2/g$.

12. The composition of claim 11 wherein the large-pore zeolite catalyst contains one or more of zeolite Y, zeolite beta, ZSM-5, ZSM-11, and amorphous acidic material.

13. A composition comprising a major amount of a large-pore zeolite catalyst and a minor amount of a molecular sieve, the molecular sieve being formed by (a) combining, under gellation conditions in order to form a gel, at least one aluminum source material, at least one phosphorus source material, at least one template, water, at least one co-solvent, and an organic silicon source material, the co-solvent being a water-soluble co-solvent and capable of solubilizing the organic silicon source material, and then (b) reacting the gel under molecular sieve synthesis conditions, the co-solvent being water-soluble and capable of solubilizing the organic silicon source material.

14. The composition of claim 13 wherein the organic silicon source material is at least one alkoxide of silicon.

15. The composition of claim 14 wherein the aluminum source material is at least one of hydrated alumina, organo alumina, pseudo-boehmite, aluminum hydroxide, and colloidal alumina.

16. The composition of claim 15 wherein the organic silicon source material is at least one of tetramethylorthosilicate, tetraethylorthosilicate, tetrapropylorthosilicate, and tetrabutylorthosilicate.

17. The composition of claim 16 wherein the co-solvent is at least one of acetone, 1,2-propanediol, 1,3-propanediol, methanol, ethanol, propanol, isopropanol, butanol, and ethylene glycol.

18. The composition of claim 17 wherein the template is at least one of di-n-propylamine, diisopropylamine, and diethylamine.

19. The composition of claim 18 wherein the phosphorus source material is one or more of $H_3PO_4$, and ammonium phosphate.

20. The composition of claim 19 wherein the molecular sieve synthesis conditions include heating the gel in an autoclave for a time sufficient to crystallize the gel at a temperature ranging from about 100° C. to about 250° C.

21. The composition of claim 20 further comprising combining the aluminum source material, the organic silicon source material, the phosphorus source material, water, the co-solvent, and the template with at least one surfactant.

22. The composition of claim 21 wherein the surfactant is one or more of hexadecylamine, tetradecylamine, dodecylamine, decylamine, or octylamine, dimethylhexadecylammine or dimethyloctylamine, and trimethylhexadecylammonium chloride.

23. The composition of claim 22 wherein the template is di-n-propylamine.

24. The composition of claim 23 wherein the gel is heated in a microwave autoclave.

25. The composition of claim 24 further comprising calcining the product of step (b).

* * * * *